3,072,454
REACTIVE DYES CONTAINING METHYLOL-AMIDE TRIAZINE GROUPS

Robert S. Long, Bound Brook, and Harold T. Lacey, Westfield, N.J., and Raymond E. Kourtz, Pensacola, Fla., assignors to American Cyanamid Company, New York, N.Y., a corporation of Maine
No Drawing. Filed July 7, 1960, Ser. No. 41,250
10 Claims. (Cl. 8—54.2)

This invention relates to fibers modified by condensation with color-modified triazines containing methylolamido radicals. More specifically, it relates to cellulose fibers modified by condensation with compounds of the formula

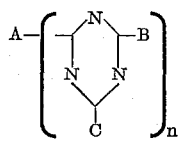

in which at least one of A and B is the residue of a dye molecule substituted by at least one ionogenic substituent, and also by an amino group through which it is linked to the triazine ring, $n$ is a positive integer which is one when B is the same as A, at least one of B and C is an amino group having at least one substituent, the said substituent being hydroxymethyl when it is not lower alkoxymethyl, B having no definition different from A and C. These dyes can be described also as 1,3,5-triazines having at least one and not more than two substituents A and at least one and not more than two substituents C, there being no substituents on the triazine ring other than A and C, A being the residue of an amino dyestuff having a replaceable hydrogen on the said amino substituent, the bonds between said dyestuff residue and the triazine rings being in place of said replaceable hydrogens, and C is an —NH$_2$ group, at least one hydrogen of all of those on said triazine amino groups being replaced by either methylol or alkoxymethyl. The latter groups are those which react to form the modified cellulose of our invention by forming a —CH$_2$O— link through the hydroxyls of the cellulose.

We have found that cellulose fibers modified by reaction with dyes of the above type are superior colored fibers showing advantageous properties in a number of respects in comparison with fibers merely dyed with related compounds having no chemically reactive bonding groups. For example, they have very high wash fastness and very high crock fastness. The reaction with these dyes is a simple application method. This modification of fibers is especially useful in combination with resin finishes for textiles, such as the melamine resins, e.g., trimethylol melamine, trismethoxymethyl melamine, or the urea resins, e.g., dimethylolurea, or dimethylol ethylene urea, and the like. The fibers can be any of various types of cellulosic fibers such as cotton, rayon, acetate rayon, and the like or blends thereof. They can also be any synthetic fiber which has reactive alcoholic hydroxyl groups or free amino groups.

The dyes used in our invention, as can be seen by the above formula, are based on the triazine nucleus. At least one and at most two of the carbons of the triazine are linked through an amino group to a dye molecule. This amino group may be either a primary or a secondary amino group in the original dye molecule. It cannot be a tertiary amino group in the original dye molecule since there would then be no replaceable hydrogen by whose elimination there can be formed a further covalent bond with the triazine nucleus. The dye residues which may be thus linked to the triazine nucleus in the dyestuffs of our invention will be described below in much detail. In that discussion, extensive reference will be made to the Chemistry of Synthetic Dyes by K. Venkataraman, Academic Press, N.Y. (1952), and to the American Chemical Society Monograph, No. 127, on "The Chemistry of Synthetic Dyes and Pigments," by H. H. Lubs, Reinhold, N.Y. (1955). While many of the dyestuffs residues which may be used in the dyes of our invention will be described in detail in the specification, in order to provide a complete disclosure, these treatises are included expressly by reference in this specification, as indicated in the various discussions.

In preparing the dyes used in our invention, the usual method of preparation involves the condensation of a monoaminodichlorotriazine or a diaminomonochlorotriazine with an amino dyestuff. Consequently, one of the important limitations on the dyestuff residues which may be in the dyes of our invention is that these dyestuffs must contain an amino group capable of forming a further covalent linkage, i.e., an amino group having a replaceable hydrogen. Such a definition includes primary and secondary amino groups and excludes tertiary amino groups. In general, the secondary amines preferably are alkylaminoaryl compounds since the diarylamines do not react as well. As described below, all the various classes of dyestuffs can be used, but those members which are usable have this one factor in common: no matter what the general class of dyestuff involved, the dyestuff must have a primary or secondary amino group which can react with the chlorotriazine to form the dyestuffs of our invention. In general, the dyestuffs of simpler structure are preferred.

The second limitation on the dyestuffs of our invention is that the dyestuff residue which forms part of the structure of the dyestuffs of our invention must contain an ionogenic group. Such ionogenic groups are necessary in order to achieve the proper water solubility for the application of the dyestuffs to the fiber. They include the more common acid radicals such as sulfonic acid, sulfonamide and carboxylic acids and also the less well known but equally usable phosphonic acid and phosphonamide radicals, as well as the more esoteric (and far less likely to be encountered) acidic substituents for organic molecules such as the arsinic acid, sulfenic acid, sulfinic acid, stibnic acid, and similar acid substituents. They also include the basic ionogenic groups such as quaternary ammonium groups. The dye residues should contain at least one and preferably two or more such solubilizing groups. Of these ionogenic groups the sulfonic acid group is by far the preferred one, with the carboxylic acid and the sulfonamide groups the next most likely to be used. Although the sodium salts of these acids are usually used, it is to be understood that any other soluble salt, such as lithium, potassium, rubidium, cesium and ammonium and quaternary ammonium salts are equally usable to get water solubility, as well as tertiary and higher chain quaternary ammonium salts, such as e.g., the diphenylguanidine and di-o-tolylguanidine salts to get solubility in other solvents.

THE DYESTUFF RESIDUES—AZO DYES

Azo dyes are described in Venkataraman in chapters 11–22, inclusive, pages 409–704. A great many azo dyestuffs are known to the art which have primary or secondary amino groups in their structure, and which carry acidic substitutents as described above. Such compounds, as described in the above-mentioned pages of Venkataraman, are expressly included by reference as usable in the formation of the dyestuffs of our invention. However, the dyes of our invention are further illustrated below with reference to specific dyestuffs, in order to show more fully the possible variations and combinations which give such flexibility to our invention.

The azo dyes represent probably the largest class of dyestuffs and the class giving the greatest flexibility in structure and color. There can be used in the dyestuffs of our invention all the variations of azo dyes known, such as the monoazo dyes, the disazo, the trisazo, the tetrakisazo, the mordant dyes, the stilbene dyes, the pyrazolone and thiazole dyes, and the like, so long as the restrictions are met of a primary or a secondary amino group through which they can be attached to the triazine ring and of the presence of acidic substituents.

To illustrate the type of dye used in our invention a simple example is as follows, wherein an azo dye derived from 2-amino-5-chloro-4-toluenesulfonic acid coupled to H-acid (8-amino-1-naphthol-3,6-disulfonic acid) is linked through the amino group to a bis-methylolamido triazine residue:

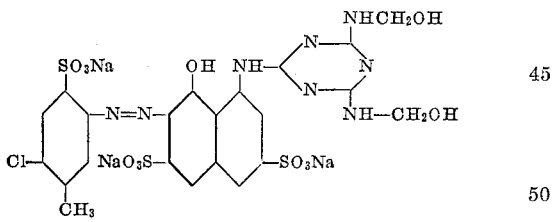

Such a dyestuff is prepared by reacting 2-chloro-4,6-diaminotriazine with the aminoazo dye, followed by treatment of the resulting diaminotriazine derivative with formaldehyde to form the methylolamido triazine compound. The methylolation reaction will be described in more detail at a later place in this specification.

The azo dye itself may be used for the reaction with the aminochlorotriazine derivative. However, in the case of azo dyes especially, there are alternative methods whereby the chlorotriazine may be first reacted with an aromatic compound, to be used as a coupling component, or as a diazo component forming the azo molecule. In the reaction, for example, of an aminonaphthol with an aminochlorotriazine followed by coupling of a diazo component into the naphthol, there is obtained the same dyestuff which would be obtained by first coupling into the free aminonaphthol and then condensing the azo dyestuff with the aminochlorotriazine. Similarly, the aminochlorotriazine may be reacted with one amino group in an aromatic diamine and the other amino group can be diazotized and coupled to form the azo derivative. These synthetic methods can be illustrated by the following equations. In the first, chlorotoluidine sulfonic acid is diazotized and coupled with H-acid to form the azo dye and this is then condensed with 2-chloro-4,6-diamino triazine to give the diaminotriazinylamino azo dye which in turn is condensed with formaldehyde to give the dye used in our invention:

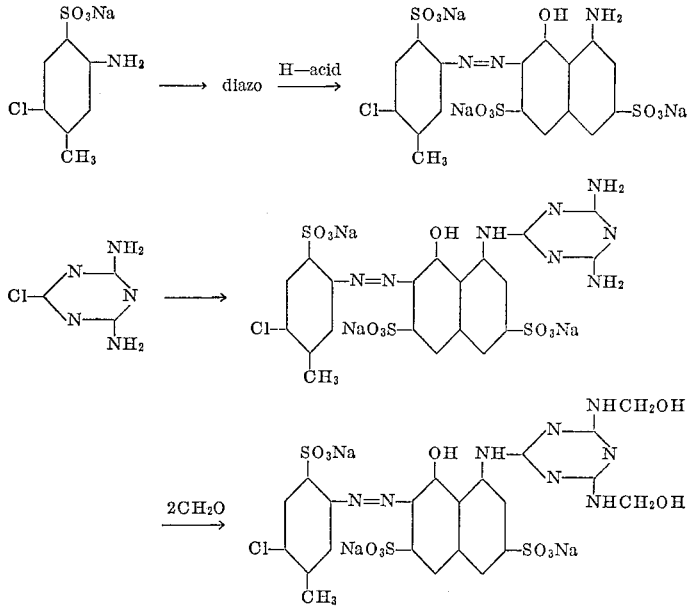

Alternatively, the same dyestuff can be prepared by reacting H-acid with 2-chloro-4,6-diaminotriazine and coupling the reaction produce with chlorotoluidine sulfonic acid (CTS) diazo, followed by treating the final product, as before, with formaldehyde:

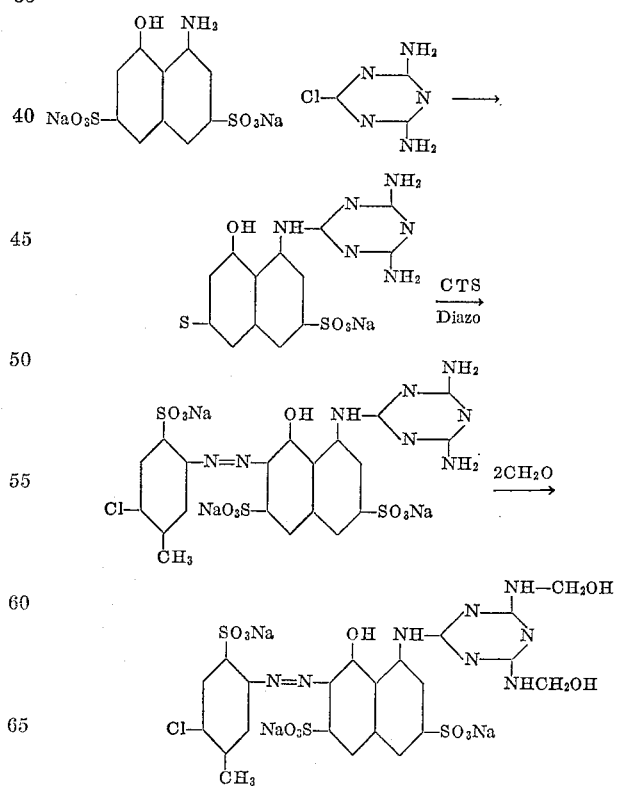

A third alternative way of preparing the dyestuffs used in our invention in which the dyestuff residue attached to the triazine is an azo dye is illustrated in the following equation in which p-aminoacetanilide is reacted with the chlorodiaminotriazine, the acetyl group is hydrolyzed off, and the liberated amino group is diazotized and coupled into Schaeffer acid:

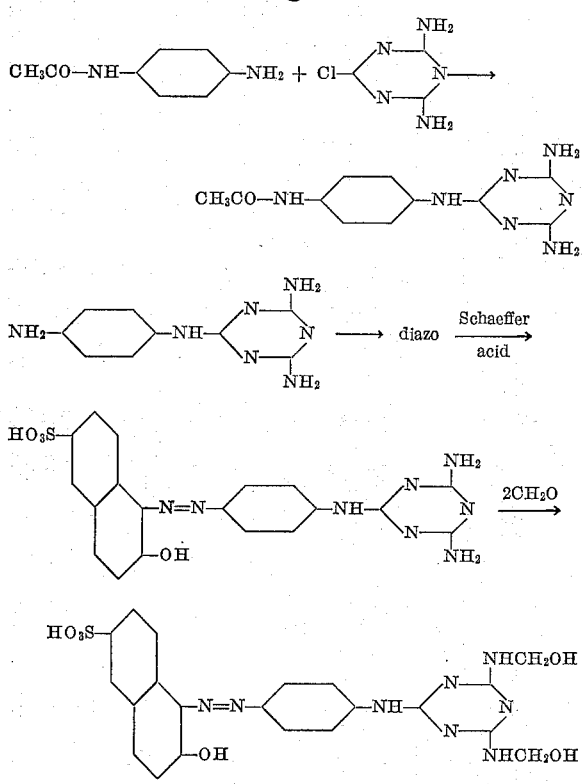

Obviously, if there are further amino groups in the completed dye molecule, or if the dye molecule is capable of further coupling disazo, trisazo and tetrakisazo dyestuffs can be readily prepared, either before or after the diaminotriazinyl radical is placed upon an amino group in the dyestuff residue. Also, more than one such diaminotriazinylamino residue can be placed upon a dyestuff radical (for example by coupling an aminoazo dye having a diaminotriazinylamino substituent into an azo component having an open coupling position and also having a diaminotriazinylamino substituent). Likewise, by starting from a 2-amino-4,6-dichlorotriazine more than one azo dyestuff residue can be placed upon the triazine radical. In such case there is left on the triazine radical only one amino to be hydroxymethylated.

An alternative preparation of the dyes used in our invention starts from the amino dyestuff and 2-chloro-4,6-bis-(methoxymethylamino)triazine. The latter is prepared by methylolation and alkylation of the chlorodiaminotriazine before reaction with the amino dyestuff, instead of afterwards.

The preparation of the azo dyes may be carried out under conventional conditions, whether the azo dye is prepared first and then reacted with the chlorotriazine to form the dyes of our invention, or whether the chlorotriazine is reacted with either the diazo component or the coupling component and the azo dye is then subsequently synthesized. The reaction of the azo dye or its fragments with the chlorodiaminotriazine or dichloromonoaminotriazine may be carried out under various conditions. For example, either aqueous or non-aqueous conditions can be used. The reaction under aqueous conditions is carried out in the presence of an acid binding agent, such as sodium carbonate or potassium carbonate to take up the hydrogen chloride evolved. In a non-aqueous system an amine salt of a sulfonated dye is conveniently used, which will confer solubility in an organic solvent, since the azo dye must contain an ionogenic group. Such an amine salt as the di-o-tolylguanidine salt is quite conveniently used in the reaction with the chlorotriazine derivatives. After the condensation reaction with the chlorotriazine derivative, the amine salt is hydrolyzed and the product is then reacted with formaldehyde to form the methylolamido derivative.

The azo dye residues of the new triazine dyes which form our invention are derived from various diazo components and coupling components. Examples of the amines which may be used for the diazo components are:

Aniline
o-Nitroaniline
m-Nitroaniline
p-Nitroaniline
o, m, and p-Chloroaniline
2-nitro-4-chloroaniline
2-amino-5-nitrotoluene
4-amino-3-nitrotoluene
2-amino-4-nitrotoluene
2-amino-5-chlorotoluene
2-amino-4-chlorotoluene
2-amino-6-chlorotoluene
2,5-dichloroaniline
3,4-dichloroaniline
3-amino-4-chlorotoluene
o-Anisidine
3-nitro-4-methoxyaniline
4-nitro-2-methoxyaniline
2-nitro-4-ethoxyaniline
Dianisidine
1-amino-2,5-ethoxy-4-benzoylaminobenzene
4-amino-1-benzoylamino-3,6-dimethoxybenzene
Benzidine(including monoacyl derivatives)
Tolidine
4-chloro-2-methoxyaniline
1,5-dimethoxy-2-amino-4-chlorobenzene
1-methoxy-2-benzoylamino-4-chloro-5-amino-benzene
1-naphthylamine
1-aminoanthraquinone
1-amino-3-chloroanthraquinone
4-diethylsulfamido-2-amino-1-methoxybenzene
1-methoxy-2-aminobenzene-4-ethylsulfone
6-benzoylamino-4-amino-3-methyltoluene
4-methoxy-4'-aminodiphenylamine
4-aminodiphenylamine
4-chloro-2-aminodiphenyl ether
4,4'-dichloro-2-aminodiphenyl ether
o-Aminodiphenylamine
2,6,4'-trimethyl-3'-nitro-4-aminoazobenzene
5-methyl-4-methoxy-2-amino - 2' - chloro - 4' - nitroazobenzene
4'-aminodiphenylamino-4-azotoluene
2-phenylazo-1-naphthylamine
2-aminodiphenylether-4-sulfonic acid
2-amino-2'-methyldiphenylether-4-sulfonic acid
4-aminoazobenzene
4-aminoazobenzene-4'-sulfonic acid
4-aminoazobenzene -3,4'-disulfonic acid
Orthanilic acid
1-methyl-4-aminobenzene-3-sulfonic acid
2-amino-5-chloro-4-toluenesulfonic acid
4-chloroaniline-2-sulfonic acid
Aniline -2,5-disulfonic acid
4-chloro-5-methyl-2-aniline sulfonic acid
3-amino-1-methoxybenzene-4-sulfonic acid
2,4-dimethylaniline-6-sulfonic acid
3-amino-1-trifluoromethylbenzene-4-sulfonic acid
3,4-dichloroaniline-6-sulfonic acid
3,5-dichloroaniline-6-sulfonic acid
3-methoxyaniline-6-sulfonic acid
4-methylaniline-6-sulfonic acid
Dehydrothiotoluidine sulfonic acid
2-aminonaphthalene-4,8-disulfonic acid
2-aminonaphthalene-6-sulfonic acid
2-aminonaphthalene-6,8-disulfonic acid
1-aminonaphthalene-4,5,6 and 8-sulfonic acid
2-aminonaphthalene-5,7-disulfonic acid
2-aminonaphthalene-7-sulfonic acid p-Phenylenediamine
3,3'-dichlorobenzidine
3,3'-benzidine disulfonic acid
2,2'-dichloro-3,3'-dimethoxy-4,4'-diaminodiphenyl
3-aminopyridine
6-aminoquinoline Examples of the compounds which may be used as the coupling components are:
Aniline
o-Toluidine
m-Toluidine
2,5-dimethylaniline
o-Anisidine
m-Anisidine
3-amino-4-methoxytoluene
2,5-dimethoxyaniline
N-methylaniline
N-methyl-o-toluidine
N-methyl-m-toluidine
N-ethyl-o-toluidine
N-methyl-2-methoxy-5-methylaniline
N-ethyl-2-methoxy-5-methylaniline
N-methyl-m-anisidine
N-ethyl-m-anisidine
1-amino-8-naphthol-6-sulfonic acid
1-amino-8-naphthol-3,6-disulfonic acid
1-amino-8-naphthol-4,6-disulfonic acid
1-methylamino-8-naphthol-6-sulfonic acid
2-amino-5-naphthol-7-sulfonic acid
2-methylamino-5-naphthol-7-sulfonic acid
1-amino-8-naphthol-2,4-disulfonic acid
1-amino-8-naphthol-4-sulfonic acid
1-amino-8-naphthol-6-sulfonic acid
3-methyl-5-pyrazolone
1-phenyl-3-methyl-5-pyrazolone
1-(4-sulfophenyl)-3-methyl-5-pyrazolone
1-(4-chlorophenyl)-3-methyl-5-pyrazolone
1-phenyl-3-carbethoxy-5-pyrazolone
Acetoacetanilide
4-sulfo-acetoacetanilide
Bis-acetoacetbenzidide
Bis-acetoacettolidide
Acetoacettolidide
Beta-hydroxynaphthoic acid arylides of various naphthoic acids such as 3-hydroxy-2-naphthanilide
3-hydroxy-2-naphthoyltoluidide and the like.

Many other coupling components and diazo components are described in the various chapters of Venkataraman covering the azo dyes, found on pages 409–704 of that treatise. Any combination of these components which produces an azo dye having (1) an amino group capable of reacting with the chlorotriazine derivative (i.e., a primary or secondary amino group) and (2) which also has an ionogenic substituent, is capable of forming the dyestuffs of our invention which contains azo dye residues. A great many such dyes are specifically disclosed in these chapters. As stated above, the amino group may be either a primary or a secondary, but not a tertiary amino group. There must be one hydrogen capable of replacement by the chlorotriazine.

VAT DYE RESIDUES

The various anthraquinone and other polyquinoid structures which are known collectively under the generic term of "vat dyes," are described in Venkataraman in chapters 27–34, inclusive, pages 803–1058. By the very nature of vat dyes, most of them lack the acidic group which is a necessity in the application of the dyestuffs of our invention. However, forms of them with free sulfonic or carboxylic acid substituents are known in the literature and in commerce in various uses. Also, vat dyes having amino groups which can be quaternized as well as amino groups for linking to the triazine are available in the literature. To the extent that anthraquinones and other vat dye structures are available having primary or secondary amino substituents, and also ionogenic substituents, they are readily usable in the dyestuffs used in our invention in the same way as the azo dyestuff residues.

Examples of some of the anthraquinonoid compounds which may be used to form the dyestuffs used in our invention are:

1-amino-4-(4'-aminophenylamino) - anthraquinone - 2,3'-di-sulfonic acid
1-methylamino-4-(4'-aminophenylamino)-anthraquinone-2,3'-disulfonic acid
1-amino-4-(4'-aminophenyl) - anthraquinone - disulfonic acid
1-amino-4-(4'-aminophenylamino) - anthraquinone-2,3',5'-trisulfonic acid
1-amino-4 - (4'[4'' - aminophenylazo] - anilino) - anthraquinone-2,5,2''-trisulfonic acid
1-amino-4 - (4' - [4'' - aminophenyl] - anilino) - anthraquinone-2,5,3''-trisulfonic acid
1-amino-4-(4'-aminophenylamino) - anthraquinone - 3'-sulfonic acid
1-amino-4-(3' - aminophenylamino) - anthraquinone - 4'-sulfonic acid
1-amino-4-(4' - aminophenylamino) - anthraquinone - 2-sulfonic acid
1-amino-4-(3'-amino - 4' - methylphenylamino) - anthraquinone-2-sulfonic acid
1-amino-4-(4' - amino - 3' - methylphenylamino) - anthraquinone-2-sulfonic acid
1-amino-4-(3'-amino-4',6' - dimethylphenylamino) - anthraquinone-2-sulfonic acid
1-amino-4-(4'-aminophenylamino) - anthraquinone - 3'-sulfonic acid diethylamide In addition to this there is a class of anthraquinonoid compounds which may be represented by the formula:

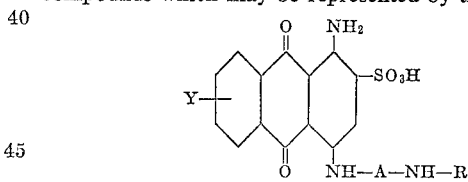

in which Y is hydrogen or sulfonic acid and A represents an arylene radical which may be further substituted with acidic groups such as sulfonic acid or carboxylic acid and where R is hydrogen, alkyl, aralkyl or cycloalkyl. The aromatic diamine portion of this molecule —NHANHR— may be derived from various aromatic diamines such as:

m-Phenylene diamine
p-Phenylene diamine
Benzidine
Dichlorobenzidines
4,4'-diaminoazobenzene
m-Phenylenediamine-4-sulfonic acid
p-Phenylenediamine-3-sulfonic acid
Benzidine-3-sulfonic acid
p-Phenylenediamine-2-sulfonic acid
4,4'-diaminoazobenzene-2-sulfonic acid
p-Phenylenediamine-2-carboxylic acid and the like.

Of especial importance along this line are the acid anthraquinone dyes described in chapter 29 of Venkataraman, pages 834–860, wherein a large number of compounds having the characteristics desirable for use in the preparation of the dyestuffs used in our invention are found. Also of especial interest in preparing the dyes of our invention are the solubilized vat dyes described in chapter 34, pages 1046–1058 of Venkataraman. The importance of the solubilizing technique of forming leuco sulfuric acid ester salts of the vat dyes is that a great many of the vat dyes otherwise unusable because they lack solubilizing groups can, by this technique, be converted into compounds which can form the dyestuff residue in the dyes of our invention. Such dyes need an extra aftertreatment in addition to the acid curing to convert the leuco ester to the oxidized form. This aftertreatment is an oxidation such as is normally used in the treatment of goods printed or padded with soluble vats.

PHTHALOCYANINE RESIDUES

The phthalocyanine structure is known to be a highly stable and highly colored chemical structure. Its use in pigments is well known and is described in Venkataraman, chapter 38, pages 1118–1142. Various amino substituted phthalocyanines are known including many which are sulfonated or carboxylated or otherwise substituted by an acid grouping. Similarly, ones are known with quaternary amino substituents. Such compounds are readily usable in preparing the dyes of our invention. The amino groups may be directly on the phthalocyanine rings or they may be in a side chain such as an aminomethyl group or an aminosulfonanilide group. The side chain is preferred because of ease of preparation, since such products can be prepared from the phthalocyanine itself by treatment with methylolphthalimide and sulfuric acid as described in the United States Letters Patent 2,761,688 to Lacey. Sulfonation can occur at the same time under the proper conditions and up to four aminomethyl groups can readily be introduced as well as up to four sulfonic acid groups. Also phthalocyanine carboxylic acids can be aminomethylated in the same manner. Similarly, the nuclear substituted phthalocyanines such as those containing one to four chlorines can be sulfonated and aminomethylated. The total number of substituents should not exceed nine in one phthalocyanine molecule. The phthalocyanines are used either in the form of the metal-free phthalocyanine or in the form of copper, cobalt, nickel or other metal complexes in which form they are also used in our invention.

The other classes of dyestuffs which are known are generally of less importance than the three classes described above. However, they may have the necessary combination of an acid grouping and a primary or a secondary amino group, and when they do they can be used in the preparation of dyestuffs of our invention. Compounds having the necessary prerequisites can be found among the xanthene, acridine and azine dyestuffs, e.g., described on pages 740–795 of Venkataraman.

A complete line of the dyes of our invention will necessarily include azo structures, vat structures, and phthalocyanines, at the least, in order to get the minimum variety needed of colors and properties.

THE HYDROXYMETHYLATION REACTION

The discussion above has dealt with the dyestuff residue which gives the coloring component to the dyestuffs used in our invention. For the coloring constituents of the dyes used in our invention we take from the known classes of dyestuffs, as has been discussed, as long as the necessary characteristics of a solubilizing ionogenic substituent and a primary or secondary amino to form a link to the triazine nucleus are present. It it is now necessary to discuss in more detail the part of the structure of our modified cellulose which is the link between the dye residue and the textile fiber.

The dyestuffs used in our invention are fundamentally dyes which react with the fiber. In order to achieve this, we place upon the known dyestuff molecules a diaminotriazinylamino substituent and then react formaldehyde with the amino groups on the triazine ring, to form hydroxymethylaminotriazine derivatives. Normally we start with either 2,4-dichloro-6-amino-1,3,5-triazine or 2,4-diamino-6-chloro-1,3,5-triazine. When the chlorines of these two compounds have been replaced with the residue of a dyestuff linked to the triazine ring through an amino or secondary amino group, the resultant aminotriazines are then reacted with formaldehyde to form the methylolaminotriazine derivatives which are the dyes used in our invention. The same result can be achieved by reacting cyanuric chloride with amino dyestuffs to replace either one or two of the chlorines by the residue of the dyestuff linked to the triazine through an amino group. The remaining triazine chlorines can then readily be replaced by amino groups by reaction with ammonia to give the same intermediates as are obtained from the amino chloro triazines and the amino dyestuffs. Various degrees of methylolation are possible, depending on the amount of formaldehyde used and the reaction conditions. At least one hydroxymethyl group must be present on a triazineamino group. Usually more are preferred. Some of the various possibilities are illustrated in the following formulae, in which D—NH— represents the dyestuff residue as described above:

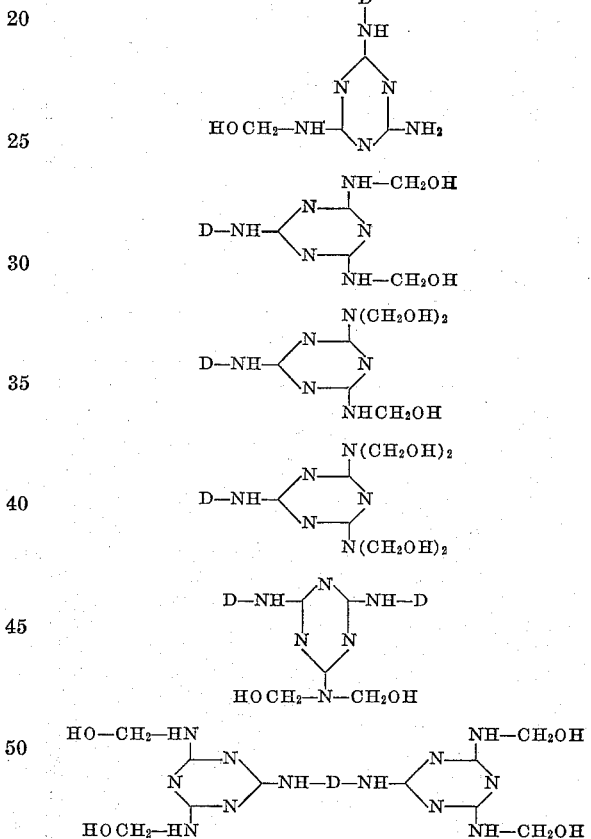

Although these formulae all show the D linked to the triazine through an NH group, it should be understood that the NH may also be an NR where R is a lower alkyl organic radical (i.e., the dyestuff might have had a secondary amine instead of a primary amine). The main thing that these various structures illustrate is the varying degree of methylolation of the triazinylamino groups and the various combinations of dyestuff residue and triazine rings. Either one or two methylol groups may be substituted for hydrogen atoms on each triazinylamino group. At least one methylol group must be present in the dyestuffs used in our invention.

The extent of methylolation will depend on the amount of formaldehyde used and the conditions of the reaction such as time, temperature, and pH. The reaction with the formaldehyde is usually carried out in alkaline aqueous solution, preferably at about 70° C. The molar ratio of formaldehyde is usually used to control the amount of methylolation achieved.

The methylolamino triazine derivatives can be alkylated by reaction with an alkanol in aqueous acid solution forming alkoxymethylamino derivatives. Such alkylation gives an added stability to the molecule but the product can be applied to the fiber in the same manner as the methylolaminotriazine derivatives. The alcohols which may be used include the ordinary alkanols such as methanol, ethanol, propanol, butanol, hexanol, lauryl alcohol, octadecyl alcohol and the like. In addition, secondary and tertiary alcohols such as secondary and tertiary butanol and triphenyl carbinol and substituted alcohols such as ethylene chlorhydrin, glycol, ethoxyethanol, polyglycols and the like can be used. In general, since water solubility is desired, the lower alkanols such as methyl and ethyl are preferred. Higher alcohols tend to give water insoluble materials but this effect can be overcome by the presence of more acid groups in the molecule. Also the use of polyglycols tend to confer water solubility.

APPLICATION OF THE DYES

The above dyes may be applied to various types of cellulosic fibers such as cotton, viscose rayon, acetate rayon, cuprammonium rayon, and the like, or blends of these with each other to form species of our invention. In addition, they may be applied to any other blends of these fibers with nylon, glycol, polyterephthalate or polyacrylonitrile, or other synthetic fibers having reactive hydroxyl or amino groups.

The method of applying the dyes to form our invention involves a heat curing treatment whereby the dye becomes more firmly affixed to the fiber. During the curing period a reaction takes place between the methylolamino or alkoxymethylamino group and the fibrous material so that an actual chemical bonding takes place. The fibers of our invention are thus chemically modified fibers and not the original fibers merely colored. The fibers of our invention should have at least 0.01% of their total weight as the dye-modified triazine moiety in chemical combination with the fiber.

In applying the new dye to fabrics, the dye may be applied by a dyeing procedure, by a padding procedure, or by a printing procedure, such as are standard in the dyestuff industry. After the dye has been applied the dyed fabric is dried. It is then necessary to cure the dyestuff by heating, a process which effects condensation of the methylolamino or alkoxymethylamino groups with the fiber and consequently achieves direct chemical bonding of the dyestuff to the fiber. Unreacted dyestuff is then removed by a light soaping after treatment.

The temperatures, concentrations, pH's, catalysts, drying times and curing times will vary depending on the dye and fiber. Typical conditions can be exemplified by the conditions for application to cotton of the dyestuff:

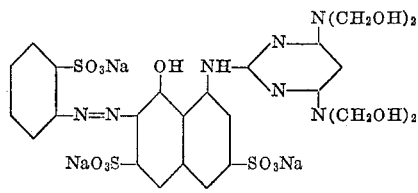

This dyestuff is applied from solution at a pH between 3.75 and 9.2 by padding at 90° C. for about 2 minutes. After mechanical removal of excess dye solution the dyeing is dried at 160° F., then oven cured at 350° F. It is then soaped at the boil for five minutes.

In general, padding is carried out at any temperature from 10–90° C., with about 35° C. being preferred. The pH preferred is 5–7. Drying is carried out at 70–120° C. with about 100° C. being preferred. The cure is carried out from 120–210° C. with 150–175° C. being preferred. Curing is carried out from ½ to 3 minutes with 1½ to 2 minutes preferred, the time varying inversely with the temperature of cure.

Curing requires an acid catalyst, at least 2% by weight based on the dyestuff, with the exact preferred amount being a function of the individual catalyst. Catalysts which can be used include magnesium chloride, zinc chloride, zinc nitrate, aluminum nitrate, isopropanolamino hydrochloride, butanolamine hydrochloride, ammonium sulfate, diammonium hydrogen phosphate, ammonium chloride, oxalic acid, tartaric acid, phosphoric acid or suitable mixtures thereof. Especially preferred are 10–20% by weight of zinc nitrate or 70% isopropanolamine hydrochloride.

It is an advantage of our invention that these dye-modified fibers have greatly improved wash fastness and crock fastness over the fibers dyed with amino dyestuffs not containing an amino triazine residue. The dyestuffs used in our invention being bonded directly to the fiber, do not wash or rub off, as do those fixed by substantivity only. Even when the dyestuff residue is linked to a diaminotriazine radical which has not been reacted with formaldehyde to form the methylol derivative, the product is not fast to washing and crocking. It is absolutely necessary for such properties to have at least one methylol group substituting the amino groups and preferably more.

This application is a continuation-in-part of our co-pending application, Serial No. 769,995, filed October 28, 1958.

Our invention can be illustrated by the following examples which parts are by weight unless otherwise specified.

*Example 1*

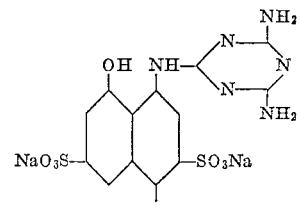

A solution of 8.3 parts of H-acid (8-amino-1-naphthol-3,6-disulfonic acid) in 400 parts of water and 10.6 parts of sodium carbonate is heated to 70° C. and to it is added 7.3 parts of 2-chloro-4,6-diamino-s-triazine. The mixture is heated at the reflux temperature until a test shows the absence of aromatic amino group. The solution is then cooled to 10° C. and some ammeline is removed by filtration as the sodium salt. The solution of the triazine product is used for the coupling in Example 2.

*Example 2*

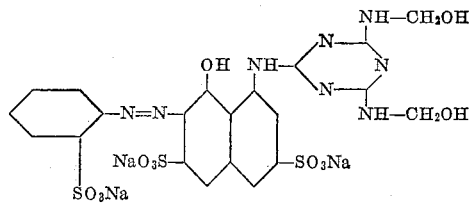

A diazo solution from orthanilic acid is prepared by diazotizing 4.0 parts of orthanilic acid by suspending 4 parts of orthanilic acid in 80 parts of water at 25° C. and adding approximately 10 parts of 10% sodium hydroxide solution. After icing to 0° C., approximately 33 parts of 10% hydrochloric acid is added and the diazotization carried out by adding approximately 22.7 parts of normal sodium nitrite solution. After stirring a short time, the diazo is added to the solution of condensation product of Example 1 maintaining the pH at about 9.

After coupling is complete, the mixture is heated to 70° C. and 7.5 parts of 36% formalin is added (2.65 parts real). The mixture is heated at 70–75° C. for a short period giving a solution of the methylolamido derivative containing two methylolamido groups per molecule. The dye is isolated by salting out from the solution by the addition of sodium chloride.

The extent of methylolation may be increased by further treatment with formaldehyde. Thus, by heating 75 parts of the above solution with 3.75 parts additional 36% formalin for 2½ hours, a dye is formed containing three methylolamido groups per molecule.

Example 3

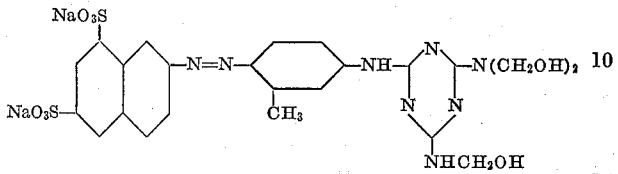

42.1 parts of the dye obtained by coupling the diazo of 7-aminonaphthalene-1,3-disulfonic acid to m-toluidine is dissolved in 300 parts of water and the pH is adjusted to 6.5 to 7.0 by the addition of dilute hydrochloric acid. 14.6 parts 2,4-diamino-6-chlorotriazine is added and the resulting slurry is heated at reflux with good stirring until the reaction is substantially complete. Sufficient sodium carbonate solution is added to maintain a pH of 6.5 to 7.5.

The mixture is cooled to 70° C., and clarified to remove some insoluble material. The product is then isolated by salting with 45 parts sodium chloride, yielding 53 parts of the diaminotriazinyl dye intermediate.

The above intermediate is slurried in 250 parts water and 125 parts methanol. The whole is then heated to reflux with good stirring. A solution of 21 parts paraformaldehyde, dissolved in 20 parts 37% formalin, 50 parts methanol, 25 parts water and 1 part 5 N sodium hydroxide is added gradually to the dye slurry. After about half has been added a solution is formed. The pH is kept at 8.5–9.0 by the occasional addition of 5 N sodium hydroxide. After the formaldehyde addition is complete the whole solution is heated an additional four hours at reflux. The hot solution is then filtered. The filtrate is then evaporated at 50–60° C. under reduced pressure to a thick viscous syrup. The syrup is then triturated with 60 parts methanol and poured into a well stirred solution of 1000 parts acetone forming a bright yellow precipitate. The solid is collected by filtration and washed with 50 parts acetone, then dried at 30–35° C., yielding 61 parts of the dye which analyzes as having 3 methylol groups.

This dyestuff is also obtained when the procedure of Example 40 is used to prepare the diaminotriazinyl derivative before methylolation. In such case the aminoazo dye is used in equivalent amounts in place of the phthalocyanine sulfanilide (prepared in the first paragraph) in the reaction with cyanuric chloride, followed by ammonolysis.

Example 4

Two parts of the dye, the product of Example 3 containing three methylolamido groups, is dissolved in 96 parts of water and to this solution is added 4 parts of a 10% solution of zinc nitrate, giving a solution with a pH of about 5.5. Cotton fabric is padded through this solution and passed through rolls adjusted so that the pick-up is approximately 85%. The fabric is dried approximately two minutes at 225° F. and then cured for one and one-half minutes at 350° F.

The dyeing is then soaped at 160° F. in a solution containing 0.64 oz. per gallon of neutral oleate soap and 0.25 oz. sodium carbonate per gallon, rinsed and dried at 225° F. The cotton fabric is dyed a bright red color with excellent wash fastness and crocking properties.

In place of the dye used above one may use the products of Examples 9, 33, 40, 45 or 48.

When the above procedure, using the same quantities, is applied to viscose rayon instead of cotton, a similar dyeing with equal fastness is obtained.

Example 5

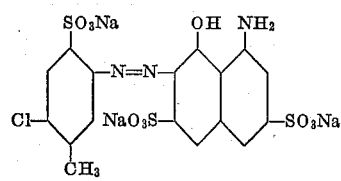

A diazo solution was prepared from 4-methyl-5-chloroorthanilic acid by first preparing a solution of 44.1 parts of this compound in 400 parts of water at 0 to 5° C. containing 8 parts of sodium hydroxide. Then 26.5 parts of 10% hydrochloric acid is added and the diazotization is carried out by the addition of 12.4 parts of sodium nitrite (180 parts approximately of a 1 N solution). After stirring a short time to 0–5° C. the diazo solution is adjusted to a pH of 2.5 and is coupled with H-acid in 800 parts of water together with 24 parts of sodium hydroxide and 19.5 parts of sodium carbonate. The mixture is stirred at room temperature until tests show that the coupling is complete. By the addition of 500 parts of sodium chloride, 123 parts of the final dye is precipitated.

Example 6

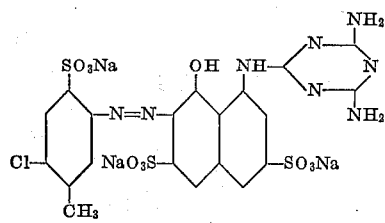

A solution of 25 parts of the sodium salt of the dye of Example 5 above in 800 parts of water is prepared. To the solution is added 17 parts of sodium carbonate resulting in a pH of about 10 and the mixture is then heated to 70° C. To this mixture is added 11.6 parts of 2-chloro-4,6-diamino-s-triazine. It is then heated to reflux and kept at the reflux temperature for an extended period until the reaction is substantially complete. Sufficient sodium carbonate solution is added after part of the heating period to maintain a pH of approximately 10. After the mixture is cooled, some insoluble material is removed by filtration and the product is then isolated by salting out of solution by the addition of 75 parts of sodium chloride.

Example 7

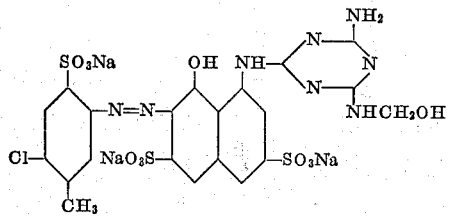

A solution of 15 parts of the diaminotriazine compound prepared in Example 6 in 700 parts of water is prepared and to it is added an aqueous solution of 2.5 parts of sodium carbonate resulting in a pH of 10.3. To the mixture is then added 20 parts of formalin containing 7.4 parts of formaldehyde and the mixture is then heated with stirring at a temperature of 87 to 90° C. for an extended period of time until the reaction is substantially complete. After heating for about half the period, the pH is found to have fallen to between 7 and 8 and an aqueous solution of 4 parts of sodium carbonate is added to bring the pH to about 10 again. After completion of the heating period, the mixture is cooled, and the product is salted out by the addition of 150 parts sodium chloride.

Example 8

A solution of 20 parts of the dye prepared in Example 5 in 800 parts of water is added to a solution of 43.7 parts of 1,3-di-o-tolylguanidine (DOTG) in 800 parts of water containing 7.73 parts of hydrochloric acid, heated to 90° C. The pH of the resulting mixture is about 4 to 5. The mixture is stirred until the reaction is substantially complete. The solid product is removed by filtration, washed well with water and finally dried.

A mixture of 22 parts of the di-o-tolylguanidine salt prepared above, 12.7 parts of 2-chloro-4,6-diamino-s-triazine and 300 parts of nitrobenzene is heated at about 150–200° C. until the reaction is substantially complete. The solid salt is removed by filtration and washed well with benzene and 95% alcohol.

The ditolylguanidine salt is converted to the sodium salt by hydrolysis with sodium carbonate solution. Thus, to a solution of 19 parts of the ditolylguanidine salt, prepared above, in 1000 parts of water is added approximately 65 parts of 10% sodium carbonate solution. The mixture is then heated at the boiling point, cooled and the diaminotriazine dyestuff in the form of its sodium salt is obtained by salting out of the clarified solution with sodium chloride.

Example 9

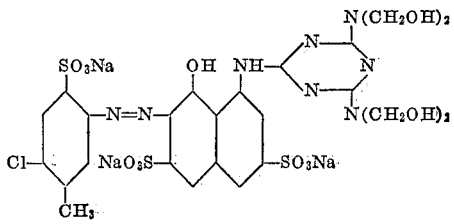

A solution of 3.44 parts of paraformaldehyde and 0.8 part of 37% formalin is prepared in 195 parts of water at 75° C. containing a small amount of sodium hydroxide. The pH of the solution is adjusted to 8.5 to 9.5 by addition of dilute formic acid and to it is then added 10 parts of the sodium salt of the diaminotriazine derivative of the product prepared above in Example 6. The mixture is heated gradually to 82–85° C. and is then refluxed gently for about 20 minutes. After cooling, the methylolamido product is isolated from the solution by salting out. The product contains nearly four methylol groups per molecule.

Example 10

Two parts of the dye isolated from the dye solution of example 3 is dissolved in 87.9 parts of water. To this solution is added 9 parts of a 10% solution of zinc nitrate, and 3.1 parts of an 80% solution of tris-methoxymethylmelamine giving a pH of about 5.5.

The cotton fabric is padded through this solution and passed through rolls adjusted so that the pick-up is approximately 85%. The fabric is dried approximately two minutes at 225° F. and then cured for one and one-half minutes at 350° F.

The dyeing is then soaped at 160° F. in a solution containing 0.64 oz. of neutral oleate soap and 0.25 oz. of sodium carbonate per gallon, rinsed and dried at 225° F. The cotton fabric is dyed a bright red color with excellent wash fastness and crocking properties. When other resin finishes for textiles, such as the melamine resins, e.g. trimethylol melamine, hexamethylolmelamine, or the urea resins, e.g. dimethylolurea or dimethylolethyleneurea, and the like are substituted for the above mentioned methoxymethylmelamine, one obtains equally good results.

In the above example, if the quantity of tris-methoxymethylmelamine used is twice that indicated, the fabric is similarly dyed, and in addition shows an improvement in wrinkle recovery of the order of 100° (warp plus fill) over the untreated fabric when tested by the Monsanto crease angle test.

Example 11

A print paste is prepared consisting of 3 parts corn starch, 1 part tapioca flour, 8.3 parts gum tragacanth (6 oz. per gallon), 1.5 parts of the methylolated dye which is the product of Example 3, and 0.3 part zinc nitrate in 43 parts of water. The resulting paste is printed on cotton, which is then subjected to a cure at 325° F. for two minutes. The cured print is soaped at 160° F. in a bath containing neutral oleate soap and sodium carbonate, and dried. The resultant print is a bright shade of good wash and crock resistance.

Example 12

To a solution of 3 parts of a styrenated alkyd resin in 10 parts of xylene and 81.6 parts of a hydrocarbon solvent, is added, with high speed stirring, a solution of 2.7 parts ammonium sulfate in 224 parts of water. A thick emulsion is thus formed, to which is added a color concentrate consisting of 10.5 parts of the methylolated dye which is the product of Example 3, and 2.1 parts of zinc nitrate, in 100 parts of water. The resultant color emulsion is printed on cotton fabric. The printed fabric is cured at 325° F. for two minutes, washed in a neutral oleate soap bath containing sodium carbonate, rinsed, and dried. The fabric is printed a bright shade of excellent crock and wash fastness.

Example 13

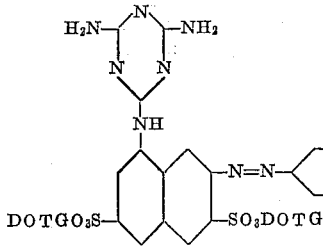 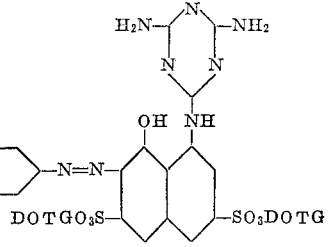

An aqueous solution of di-o-tolylguanidine is prepared by dissolving 62.2 parts in 1000 parts of water containing approximately 108 parts of 10% hydrochloride acid.

An aqueous solution of 100 parts Direct Blue 2B (Color Index No. 406, 40% real) in 3000 parts of water is added to the ditolylguanidine solution at 90° C. resulting in a temperature of 53° C. (pH approx. 5.0). After stirring for 1½ hours, the solid ditolylguanidine salt is recovered by filtration, washed with water and dried.

Twenty-five parts of the DOTG salt of the Direct Blue 2B prepared above and 10.2 parts of 2-chloro-4,6-diamino-s-triazine are added to 300 parts of nitrobenzene. The mixture is heated until the reaction is substantially complete, with stirring at 190 to 200° C. and then cooled to room temperature. The precipitated product is removed by filtration, washed with 95% alcohol and dried.

Example 14

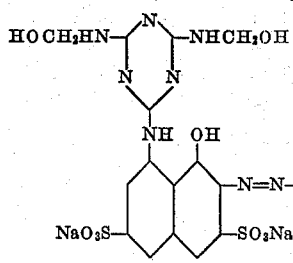 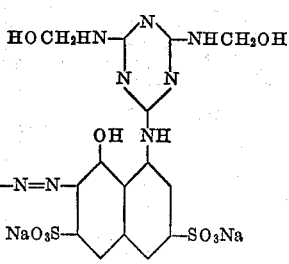

To 15 parts of the DOTG salt of the diamino-triazine compound prepared above in Example 13 in 1000 parts of water, is added sufficient 10% sodium carbonate solution to product a pH of 9.7 (4.4 parts of sodium carbonate as a 10% solution). The solution is then heated at 90–100° C. The sodium salt of the diamino-triazine dye compound may be isolated from the clarified solution by salting out with sodium chloride. To one-half of the above solution (pH 9.2) is added 15 parts formaldehyde as a 37% solution. The mixture is heated at 85–90° C. for about 5 hours. The methylol product is salted out by the addition of sodium chloride and isolated by filtration.

Example 15

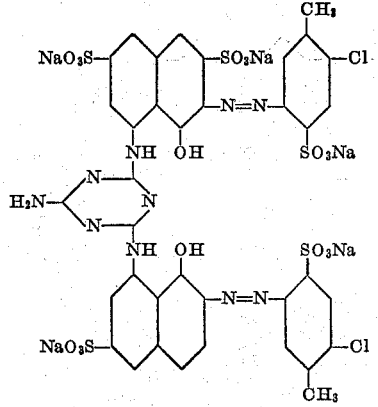

A solution of 127 parts of the dye of Example 5 in 2500 parts of water is adjusted to a pH of 7 by the addition of sodium bicarbonate and hydrochloric acid. The temperature is adjusted to 25° C. and to it is added a solution of 16.5 parts of 2-amino-4,6-dichloro-s-triazine in 300 parts of acetone. To the mixture is then added slowly 106 parts of 10% sodium carbonate solution, keeping the pH below 7.5. The temperature during the addition of the first half of the sodium carbonate solution is held at 60–65° C. and is then increased to the reflux temperature for the addition of the latter half of the sodium carbonate solution. The mixture is then heated at the reflux temperature until the reaction is substantially complete. The product is then salted out by the addition of sodium chloride, removed by filtration, washed and dried.

Example 16

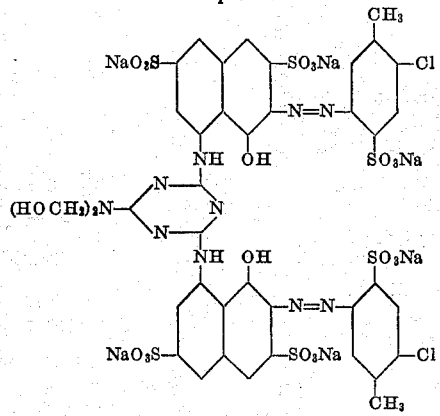

A solution of 50 parts of paraformaldehyde and 20 parts formalin is prepared in 500 parts of water containing 20 parts of N/10 sodium hydroxide solution. The pH of the solution is adjusted to 9.0 with formic acid and to it is added 26.5 parts of the aminotriazine dye prepared in Example 15. The resulting solution at a pH of 9 is heated at the reflux temperature for ½ hour. After cooling to room temperature and clarifying, the product is salted out, removed by filtration, washed and dried.

Example 17

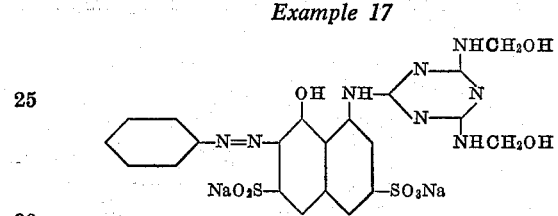

The procedures of Examples 1 and 2 are followed using an equivalent amount of aniline diazotized in the usual way in place of the diazotized orthanilic acid. The product, isolated, has the above formula.

If an equivalent amount of para-nitroaniline, paranitro-2-methoxyaniline, alpha-naphthylamine, 1-aminoanthraquinone, 2-methoxy-5-diethylsulfonamide aniline, 2-methoxy-5-ethylsulfonylaniline, or 2-aminopyridine is used in place of the aniline, the correspondingly substituted dyestuff is obtained.

Example 18

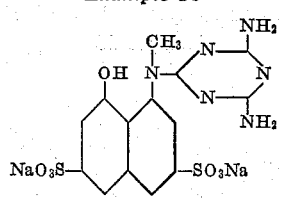

Twenty-eight parts of N-methyl H-acid is dissolved in 500 parts of water and 18 parts of 2-chloro-4,6-diamino-s-triazine are added as a dioxane solution. Thirteen parts of sodium carbonate is added. The mixture is heated at the reflux until the reaction is substantially complete and then cooled to room temperature. After filtration, the product is salted out and removed by filtration, washed with alcohol and dried.

If an equivalent amount of N-methyl-1-amino-8-naphthol-4-sulfonic acid is used in place of the N-methyl H-acid, the correspondingly substituted product is obtained.

Example 19

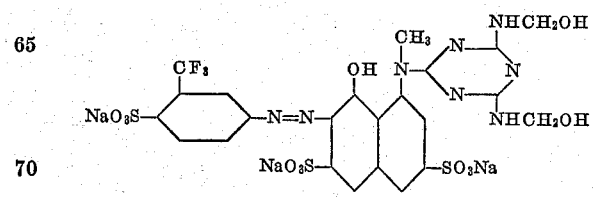

A ¹⁄₁₀ equivalent weight of sodium-4-amino-2-trifluoromethyl benzene sulfonate is diazotized in water by acidification with ³⁄₁₀ equivalents of real hydrochloric acid followed by the addition of a slight excess of sodium nitrite solution. The diazo solution is added to a sodium acetate buffered solution of the product of Example 18 in which the pH is held at between 5 and 7. After the coupling is complete the mixture is heated to 70° C. and slightly over 2/10 of an equivalent weight of real formaldehyde is added as 36% aqueous solution. The mixture is heated at 70–75° C. for a short period. The final dye is isolated by salting from the solution with the addition of sodium chloride.

If an equivalent quantity of 2-aminodiphenyl-ether-4-sulfonic acid, 4-aminoazobenzene-4'-sulfonic acid, 2-amino-5-chlorotoluene-4-sulfonic acid, dehydrothiotoluidine sulfonic acid, 2-aminonaphthalene-4,8-disulfonic acid or 1-aminonaphthalene-4-sulfonic acid is used in place of the aminotrifluoromethylbenzene sulfonic acid, the correspondingly substituted monoazo dyestuff is obtained. Similarly, when the other product described in Example 18 is used with any of these diazo components, the correspondingly substituted dyestuff is obtained.

*Example 20*

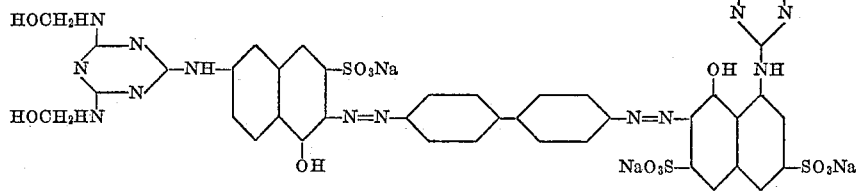

The procedure of Example 2 is followed using a double equivalent amount of tetrazotized benzidine in place of the orthanilic acid. This produces a mono-coupling with the H-acid derivative. A solution of a J-acid derivative is then added to the reaction mixture with stirring, while maintaining the pH at about 9. The product is then reacted with formaldehyde in the same manner as in Example 2, but using a double quantity of formaldehyde. The result is the unsymmetrical dye of the above structure.

*Example 21*

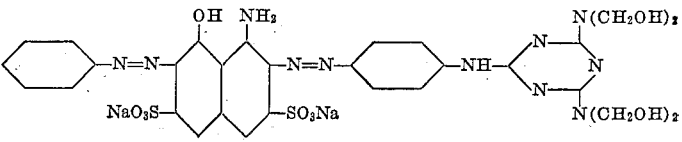

The procedures of Examples 8 and 9 are followed using in place of the product of Example 5 an equivalent quantity of Azo Dark Green A (Color Index No. 247), and using equivalent quantities of both the 2-chloro-4,6-diaminotriazine and the formaldehyde. The result is a dark green dyestuff having excellent dyeing properties.

*Example 22*

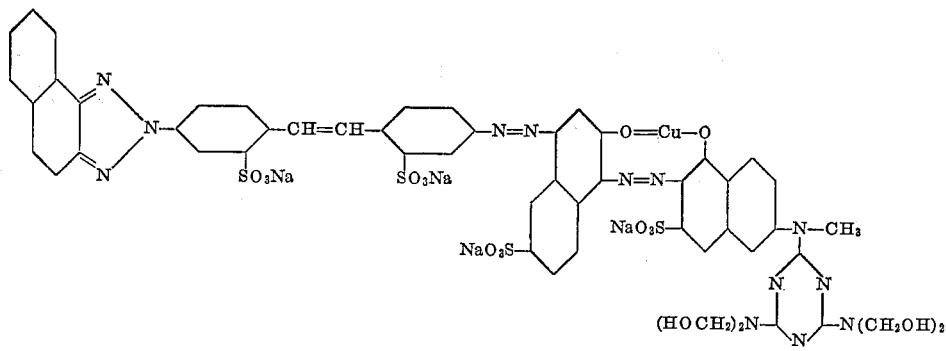

The procedures of Examples 8 and 9 are followed using in place of the dye of Example 5 an equivalent quantity of the N-methyl analog of Sirius Super Green BLT (whose structure is given on page 546 of Venkataraman). The result is a green dye of excellent light fastness and reactivity to cellulosic fibers, when applied by the method of Example 4.

*Example 23*

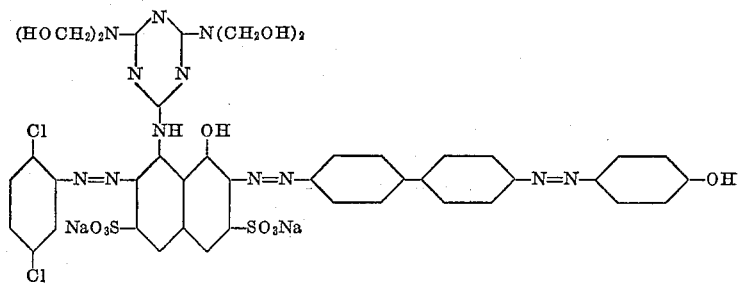

The procedures of Examples 8 and 9 are followed using in place of the dyestuff of Example 5 an equivalent quantity of Chloramine Green B (Color Index No. 589), to give the product of the above structure.

*Example 24*

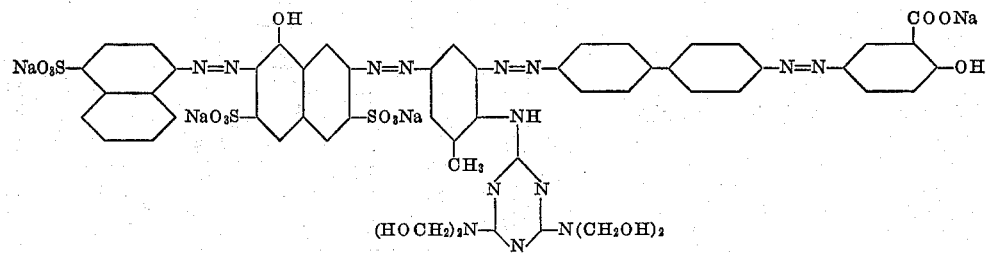

The procedures of Examples 8 and 9 are followed using in place of the dye of Example 5 an equivalent quantity of Trisulfone Brown B (Color Index No. 561), and using double quantities of both the chlorodiaminotriazine and the formaldehyde.

*Example 25*

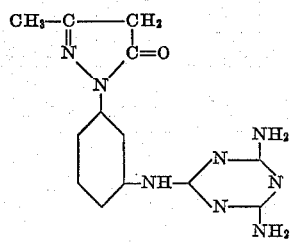

Thirty-seven parts of 1 - m-aminophenyl-3-methyl-5-pyrazolone and 18 parts of 2-chloro-4,6-diamino-s-triazine are added to 300 parts of nitrobenzene. The mixture is heated with stirring at 190–200° C., until the reaction is substantially complete and then cooled to room temperature. The precipitated product is removed by filtration, washed with alcohol and dried.

*Example 26*

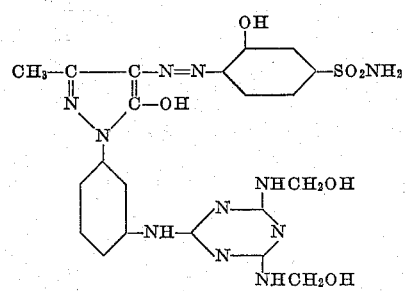

The procedure of Example 2 is followed using in place of the product of Example 1, the product of Example 25 in equivalent quantities and using as the diazo component in place of orthanilic acid 2-aminophenol-5-sulfonamide.

*Example 27*

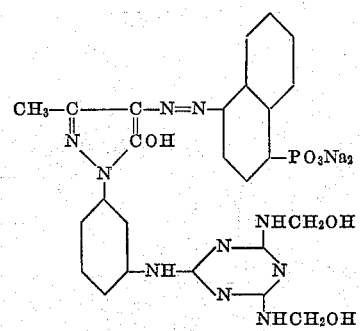

The procedure of Example 26 is followed using as the diazo component in place of the aminophenolsulfonamide, 1-aminonaphthalene-4-phosphonic acid sodium salt.

*Example 28*

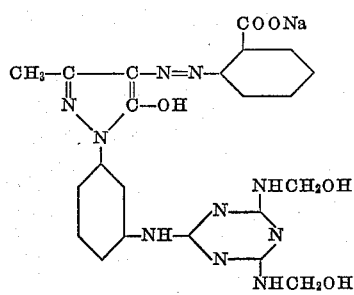

The procedure of Example 26 is followed using in place of the aminophenosulfonamide an equivalent quantity of anthranilic acid.

*Example 29*

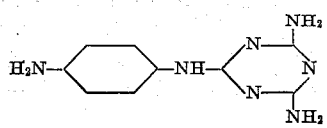

The procedure of Example 8 is followed using an equivalent quantity of p-aminoacetanilide in place of the di-o-tolylguanidine salt of the dyestuff as prepared in the first paragraph of that example. The hydrolysis in the third paragraph is carried out using sodium hydroxide instead of sodium carbonate to yield the free amine of the above structure.

Similarly, the p-aminoacetanilide may be replaced with 1-amino-4-acetylamino naphthalene, 1-amino-5-acetamidonaphthalene, 2 - amino-6-acetamidonaphthalene, 4-amino - 4'-acetamido stilbene, 4-amino-4'-acetamidobiphenyl or 4-amino-4'-acetamidoazobenzene to give similar products having other ring systems in place of the benzene ring in the above formula. Also the compound of the above formula is obtained when any other 4-aminoanilide, such as 4-aminobenzanilide, 4-amino-propionanilide, 4-aminobutyranilide, and the like are used in equivalent quantities to the p-aminoacetanilide.

*Example 30*

One mole part of the product of Example 29 is dissolved in a mixture of 25 parts of concentrated hydrochloric acid and 75 parts of water. The mixture is cooled below 5° and the amino group is diazotized by the addition of over 1 mole part of sodium nitrite in the form of a normal sodium nitrite solution and stirred at this temperature until diazotization is complete. The diazo solution is then added to a solution of one mole part of 2-hydroxy-3-naphthoic acid in 50 parts of water and containing 5 mole parts of sodium hydroxide. The mixture is stirred until the coupling is complete. The product is then treated with slightly over 2 mole parts of formaldehyde solution after adjusting the pH to about 10 with formic acid. Sodium carbonate solution is added to maintain a pH of approximately 10. The mixture is heated to reflux and kept at that temperature for an extended period until the reaction with formaldehyde is substantially complete. After the mixture is cooled, the product is isolated by salting out with sodium chloride.

*Example 31*

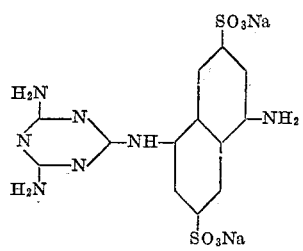

The procedure of Example 1 is followed using 1-amino-5-acetamidonaphthalene-3,7-disulfonic acid in place of the 8-amino-1-naphthol-3,6-disulfonic acid in equivalent quantities. The acetyl group is then hydrolyzed as in Example 29.

*Example 32*

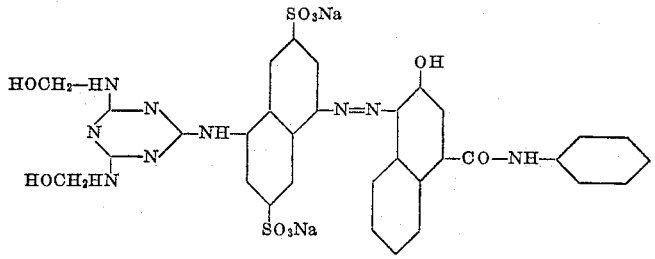

The procedure of Example 2 is followed using an equivalent quantity of the product of Example 31 in place of the orthanilic acid and using an equivalent quantity of 2-hydroxy-3-naphthoic anilide (Naphthol AS) in place of the product of Example 1.

By using equivalent quantities of other 3-hydroxy-2-naphthoic arylides known to the art as the various Naphthol AS coupling components, the corresponding dyestuffs are obtained.

*Example 33*

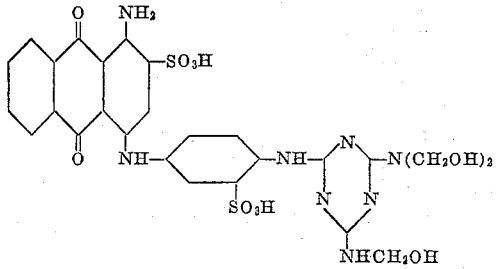

1 - amino-4-(4'-acetamido)anilinoanthraquinone-2-sulfonic acid (47.3 parts as the free acid) is added portionwise to a mixture of 430 parts of 99.5% sulfuric acid and 142 parts of 30% oleum, at 15–20° C. The mixture is heated at 40° C. for 6 hours, cooled to room temperature, and drowned in a mixture of 2000 parts water, 1600 parts ice, and 530 parts sodium chloride. The slurry is stirred at room temperature for three hours, and the product is collected by filtration and washed free of acid with 20% brine. The wet cake is then treated with 1900 parts of 5% caustic at 90° C. for one hour to hydrolyze the acetamido group, giving 1-amino-4-(4'-amino-X-sulfo)anilinoanthraquinone-2-sulfonic acid.

This intermediate is treated with 2,4-diamino-6-chlorotriazine according to the procedure of Example 3, and the resulting diaminotriazinyl derivative reacted with formaldehyde, to give the trimethylol dye, by the procedure of that example.

In place of the 1-amino-4-(4'-acetamido)-anilinoanthraquinone-2-sulfonic acid used in the above example, one may use the disulfonic analog, namely 1-amino-4-(4'-acetamido)anilinoanthraquinone-2,5(or 8)-disulfonic acid or the mixture of isomers. In that case the final product is the trisulfonic acid analog of the above methylolated dye.

The same dyestuff is obtained when the procedure of Example 40 is followed using the diaminoanilinoanthraquinone starting material in equivalent amounts to the phthalocyanine sulfanilide compound in the reaction with cyanuric chloride, followed by ammonolysis as described there.

*Example 34*

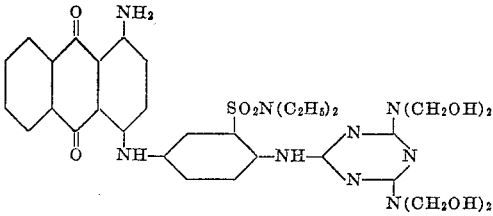

The procedure of Examples 8 and 9 are followed using in place of the dye of Example 5 an equivalent quantity of 1-amino - 4-(4'-aminophenylamino)anthraquinone-3'-sulfonyldiethylamide and heating the reaction mixture of the di-o-tolylguanidine salt and chlorodiaminotriazine at 100–150° C. instead of at higher temperatures used there.

*Example 35*

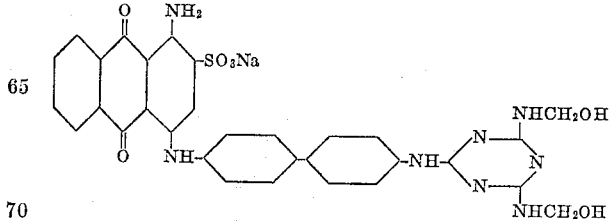

The procedures of Examples 8 and 9 are followed using, in place of the amino dyestuff of Example 5, an equivalent quantity of 1-amino-4-(4'-aminodiphenylamino)anthraquinone-2-sulfonic acid and a lower reaction temperature as in Example 34.

Example 36

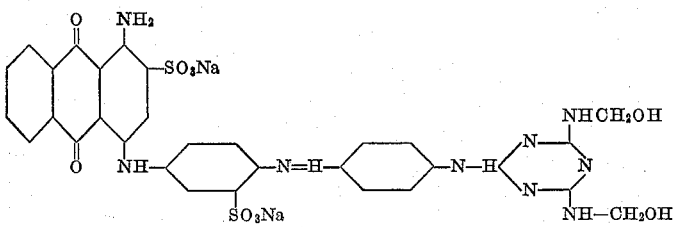

The procedures of Examples 8 and 9 are followed using in place of the dye of Example 5, an equivalent quantity of _1-amino-4(4'-aminoazobenzene-4-amino)-anthraquinone-2,2'-disulfonic acid, using a lower reaction temperature as in Example 34.

Example 37

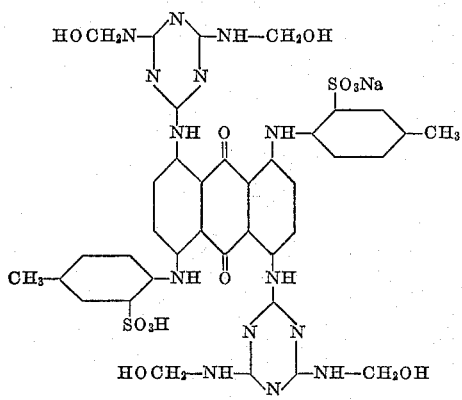

The procedures of Examples 8 and 9 are followed using double quantities of diaminochlorotriazine and using in place of the dye of Example 5 an equivalent quantity of Anthraquinone Blue SRX of the formula shown on page 839 of Venkataraman. Here too a lower reaction temperature, as in Example 32, is used.

Example 38

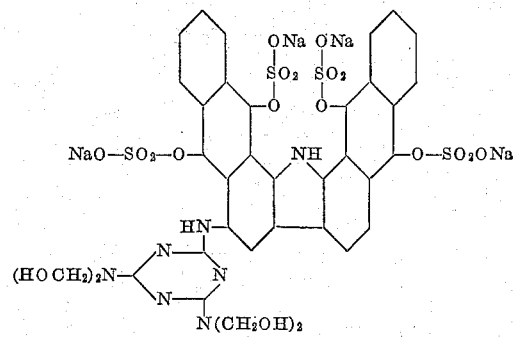

A 1/10 mole quantity of 4-benzamido-1,1'-dianthrimidecarbazole is hydrolyzed to the free monoaminodianthrimidecarbazole by heating in 20 times its weight of 90% sulfuric acid at 80° until hydrolysis is complete. The product is isolated by drowning in water, filtering, washing and drying. This product is then substituted in the procedure of the second paragraph of Example 8 for the di-orthotolylguanidine salt of the dyestuff of Example 5. The resulting diaminotriazinylamino anthrimide carbazole is then reduced and esterified by the following procedure. The product is added to a pyridine solution to which chlorosulfonic acid had been added in sufficient quantity to prepare 5 moles of pyridine-SO$_3$ per mole of the anthrimide carbazole being added. The pyridine used is about 10 parts by volume per part of anthrimide carbazole. Iron powder is added gradually and the mixture is stirred below 50° C. until the formation of the leucosulfuric ester is substantially complete. It is then drowned in a solution of sodium carbonate and water, sufficient sodium carbonate being used to basify the entire mixture.

The pyridine is removed by vacuum distillation and water is added during the distillation to keep the mixture from becoming too concentrated. The solution is then clarified by means of a filter aid. The aqueous solution of ester is then used in the process of Example 9. In salting out and isolating, it is necessary to wash the product with saturated sodium chloride solution. The product must be dried in a vacuum in order to avoid decomposition by heat.

Example 39

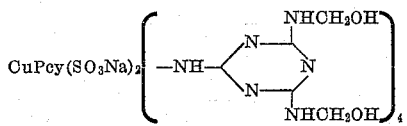

(Pcy-phthalocyanine)

The procedure of Example 8 is followed using tetra-amino copper phthalocyanine disulfonic acid in equivalent amounts in place of the dye of Example 5 and quadruple amounts of chlorodiaminotriazine. The product is then subjected to the procedure of Example 9 using double equivalent quantities of formaldehyde. The resulting phthalocyanine derivative dyes fibers a very fast blue shade by the method of Example 4.

Example 40

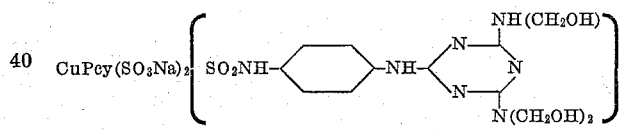

Copper phthalocyanine, 57.5 parts, is chlorosulfonated, by reaction with 537 parts of chlorosulfonic acid at 130–140° C. The crude product is treated with 15 parts of p-aminoacetanilide in aqueous acetone at room temperature for 18 hours, and the acetamido group is hydrolyzed in hot aqueous caustic. The product at this stage analyzes as the disulfonic acid derivative of copper phthalocyanine p-aminosulfonanilide. This is then converted to its dichlorotriazinyl derivative by reaction with 18.5 parts of cyanuric chloride in aqueous acetone at 0.5° C. an pH 6 to 7.5. The product is recovered by salting and filtration.

The dichlorotriazinyl derivative of disulfo-copper-phthalocyanine-p-aminosulfonanilide, in the form of its wet cake is added to 100 parts of 28% aqueous ammonia, keeping the temperature below 10° C. The mixture is then allowed to rise to room temperature during one hour, heated to 95–100° C. during two hours, and held at this range for three hours. The mixture is cooled, made strongly alkaline with caustic, and boiled to remove excess ammonia. The diaminotriazinyl derivative thus obtained is isolated by acidification of the mixture and filtration. It is then methylolated by treatment with formaldehyde in the manner of Example 3. The product is the trimethylol derivative.

Example 41

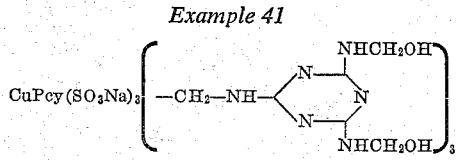

The procedure of Example 39 is followed using an equivalent quantity of trisaminomethyl copper phthalocyanine trisulfonic acid in place of the tetramino copper phthalocyaninedisulfonic acid. The diaminochlorotriazine and solvent is used in triple instead of quadruple quantities and the formaldehyde is used in one and one-half times the proportions given in Example 9.

*Example 42*

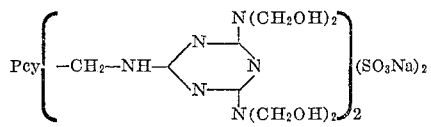

The procedure of Example 39 is followed using bis-aminomethylphthalocyanine disulfonic acid in place of the tetraaminophthalocyanine disulfonic acid. The diaminochlorotriazine is used in only double quantities over the usage of Example 8, but the formaldehyde is also used in double quantities over that of Example 8.

*Example 43*

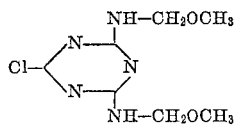

Six hundred and fifty-three parts of paraformaldehyde (containing 91% formaldehyde) are dissolved in 390 parts of methanol in 131 parts of water containing about 1.1 parts of 50% triethanolamine in about 1.2 parts of 20% sodium hydroxide solution by warming and stirring. The pH of the resulting solution is adjusted to 8.1 with formic acid. Eight hundred and sixty parts of 2,4-diamino-6-chlorotriazine is then added. The mixture is heated to 50° C. and held at that temperature until the reaction is substantially complete. Two thousand and ninety parts of methanol are then added followed by 6.4 parts of oxalic acid crystals. The reaction mass is then again heated to 50° and held at that temperature until the cloudy mixture has become clear. The reaction mixture is then slightly cooled and neutralized with 20% sodium hydroxide until the pH is approximately 10. The mixture is clarified through a filter aid and the filtrate is concentrated to a highly viscous syrup. The result is clear, completely water soluble viscous syrup of approximately the above formula. The proportion of formaldehyde to the triazine nucleus and of the methylation of methylol groups will vary from batch to batch.

If, in place of the methanol, ethanol is used the corresponding ethylated compound is obtained.

*Example 44*

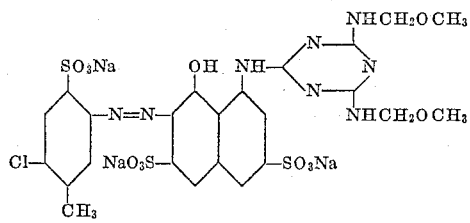

The procedure of Example 6 is followed using the product of Example 43 instead of equivalent amounts of the 2-chloro-4,6-diaminotriazine. The resulting product is dyestuff of the above formula. The same product is obtained by the use of equivalent amounts of the product of Example 6 instead of the 2,4-diamino-6-chloro-s-triazine in the process of Example 43.

*Example 45*

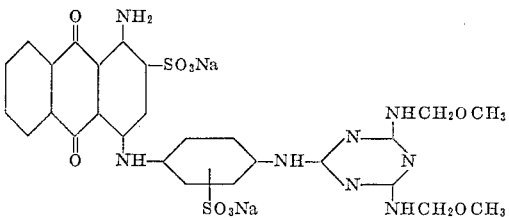

The process of Example 6 is followed using an equivalent quantity of the product of Example 43 in place of the diaminochlorotriazine and the starting dyestuff of Example 33 in place of the dye of Example 5. The same product is obtained by using the starting material of Example 33 in the procedure of Example 43 in equivalent amounts in place of the diaminochlorotriazine used in Example 43.

*Example 46*

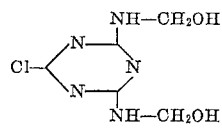

The process of Example 9 is used, using in place of the product of Example 6 diaminochlorotriazine in equivalent amounts. One-half of the quantity of formaldehyde used in Example 9 is used to give the product. When the full quantity of formaldehyde used in Example 9 is used, a tetramethylol derivative is obtained.

*Example 47*

The process of Example 8 is followed using the product of Example 46 in equivalent quantities in place of the chlorodiaminotriazine, the resulting product is the same as that of Example 9 or one of similar structure having more or less methylol groups depending on the amount of formaldehyde used in Example 46.

*Example 48*

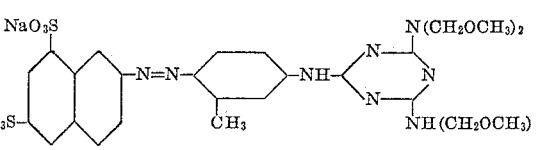

Forty-one parts of the product of Example 3 is added to 700 parts by volume of methanol and the mixture is cooled to below 5° C. Five parts by volume of concentrated hydrochloric acid is added, and the mixture is stirred for one hour below 5° C. after which sodium bicarbonate is added to discharge the acidity. The precipitated product is filtered off, washed with methanol, and dried.

*Example 49*

The diaminotriazinyl intermediate isolated in the second paragraph of Example 3, 32 parts, is dissolved in 300 parts of dimethylformamide, and 42 parts of sodium bicarbonate is added. The mixture is cooled below 5° C. and treated with 40.2 parts of chloromethyl methyl ether, added dropwise over 45 minutes. The mixture is stirred with cooling for an additional 3 hours, warmed to room temperature, and filtered for removal of salt. The filtrate is then poured into 3000 parts acetone, with stirring, and the precipitated product is filtered off, washed with acetone, and dried.

The product is the same as that obtained in Example 48.

Example 50

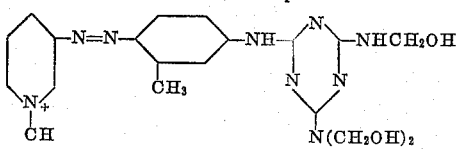

$CH_3C_6H_4SO_3^-$

The dye 3-(4'-amino-2'-tolylazo)-N-methyl-pyridinium-p-toluenesulfonate is prepared by diazotizing 3-aminopyridine, coupling to m-toluidine, and quaternizing with methyl p-toluenesulfonate. The procedure of Example 3 is then followed, using an equivalent amount of this pyridinium azo dye in place of the sulfonic acid azo dye of that example. The final product, after the reaction with formaldehyde and isolation, is a yellowish brown dye of the above structure.

Example 51

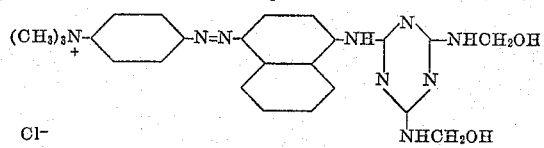

p-Aminophenyltrimethylammonium chloride is diazotized and the diazo coupled to 1-naphthylamine in weakly acid medium. The product, which is 4-(4'-aminonaphthylazo)phenyltrimethylammonium chloride, is treated by the procedure of Example 3, using an equivalent amount of this dye in place of the sulfonated azo dye of that example. The final methylolated dye is brownish orange with essentially the above structure.

If in place of p-aminophenyltrimethylammonium chloride diazo, one uses the diazo of p-aminobenzyltrimethylammonium chloride, one obtains a higher homolog of the above dye in which the trimethylammonium group is on an aliphatic carbon. This dye has a similar shade to the above.

We claim:

1. A process of modifying cellulose fibers which comprises wetting said fibers with an aqueous solution comprising at least 0.01% of a modifying agent and at least 0.0002% of an acid catalyst, said modifying agent being a 1,3,5-triazine compound having at least one but not more than two substituents A, and at least one but not more than two substituents C; each substituent A being an organic dyestuff moiety having an ionogenic substituent, said moiety being bonded through an amino group to a carbon atom of said triazine ring; and each substituent C being a member selected from the group consisting of methylolamino, dimethylolamino, alkoxymethylamino and dialkoxymethylamino; followed by drying said wet fibers and then heating said dried fibers above 120° C.

2. The process of claim 1 in which the organic dyestuff is an azo dye.

3. The process of claim 1 in which the organic dyestuff is a vat dye.

4. The process of claim 1 in which the organic dyestuff is a phthalocyanine dye.

5. The process of claim 1 in which the catalyst comprises zinc nitrate.

6. The process of claim 1 in which the catalyst comprises an alkanolamine hydrochloride.

7. A fiber comprising cellulose modified by reaction with a reagent characterized by having a 1,3,5-triazine ring, said triazine ring having at least one but not more than two substituents A and at least one but not more than two substituents C on each triazine ring, there being no substituents on said triazine rings other than said A and C; each A substituent being an organic dyestuff moiety having an ionogenic substituent, said moiety being bonded through an amino group to a carbon atom of said triazine ring; and each C substituent being an amino group, at least one hydrogen of which is replaced by a methylol group; said reaction resulting in a bonding of said reagent to a carbon of the cellulose molecule through a —$CH_2O$— linkage, there being in said modified fiber at least 0.01% by weight of said triazine reagent.

8. The modified fiber of claim 7 wherein the dyestuff is an azo dye.

9. The modified fiber of claim 7 wherein the dyestuff is a vat dye.

10. The modified fiber of claim 7 wherein the dyestuff is a phthalocyanine dye.

References Cited in the file of this patent

UNITED STATES PATENTS 2,873,269     Fasciati et al. _____ Feb. 10, 1959

FOREIGN PATENTS 595,065     Great Britain _____ Nov. 26, 1947

OTHER REFERENCES

Broden et al.: Amer. Dyestuff Reporter, January 4, 1954, pages P6–P13.

UNITED STATES PATENT OFFICE
CERTIFICATE OF CORRECTION

Patent No. 3,072,454                                January 8, 1963

Robert S. Long et al.

It is hereby certified that error appears in the above numbered patent requiring correction and that the said Letters Patent should read as corrected below.

Column 2, line 7, for "dyestuffs" read -- dyestuff --; column 9, line 27, for "2,761,688" read -- 2,761,868 --; column 12, line 26, before "which" insert -- in --; column 18, lines 23 to 29, for that portion of the formula reading:

columns 19 and 20, lines 23 to 36, for that portion of the formula reading:

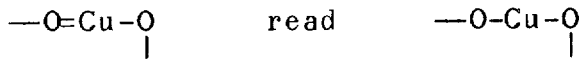

column 22, line 31, for "aminophenosulfonamide" read -- aminophenolsulfonamide --; column 25, lines 2 to 10, for that portion of the formula reading:

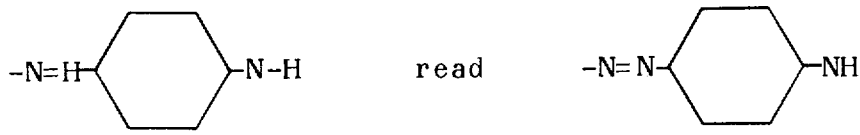

column 26, line 27, for "(Pcy-phthalocyanine)" read -- (Pcy=phthalocyanine) --; line 53, for "0.5° C." read -- 0-5° C. --; column 29, lines 5 to 8, for that portion of the formula reading:

Signed and sealed this 27th day of October 1964.

(SEAL)
Attest:

ERNEST W. SWIDER                              EDWARD J. BRENNER
Attesting Officer                              Commissioner of Patents